US011858657B2

(12) United States Patent
Ramsey

(10) Patent No.: US 11,858,657 B2
(45) Date of Patent: Jan. 2, 2024

(54) FOAMED GLASS COMPOSITE MATERIAL AND A METHOD FOR PRODUCING THE SAME

(71) Applicant: Earthstone International LLC, Santa Fe, NM (US)

(72) Inventor: W. Gene Ramsey, Warrenville, SC (US)

(73) Assignee: EARTHSTONE INTERNATIONAL LLC, Santa Fe, NM (US)

( * ) Notice: Subject to any disclaimer, the term of this patent is extended or adjusted under 35 U.S.C. 154(b) by 184 days.

(21) Appl. No.: 16/573,025

(22) Filed: Sep. 17, 2019

(65) Prior Publication Data
US 2020/0079528 A1 Mar. 12, 2020

Related U.S. Application Data

(63) Continuation of application No. 15/244,115, filed on Aug. 23, 2016, now Pat. No. 10,435,177, which is a
(Continued)

(51) Int. Cl.
| E01C 9/00 | (2006.01) |
| B64F 1/02 | (2006.01) |
| E01C 3/00 | (2006.01) |
| E01F 13/12 | (2006.01) |
| E01C 7/14 | (2006.01) |
| C04B 38/08 | (2006.01) |
| C04B 14/24 | (2006.01) |
| C03C 11/00 | (2006.01) |
| C03C 3/087 | (2006.01) |
| C03B 19/08 | (2006.01) |
(Continued)

(52) U.S. Cl.
CPC .............. *B64F 1/025* (2013.01); *C03B 19/08* (2013.01); *C03C 3/087* (2013.01); *C03C 11/007* (2013.01); *C04B 14/24* (2013.01); *C04B 28/04* (2013.01); *C04B 38/08* (2013.01); *E01C 3/003* (2013.01); *E01C 7/142* (2013.01); *E01C 9/007* (2013.01); *E01F 13/126* (2013.01); *C04B 2111/0075* (2013.01); *C04B 2111/00612* (2013.01)

(58) Field of Classification Search
CPC .......... E01C 3/003; E01C 9/007; B64F 1/025
USPC .............................. 404/6, 10, 72; 244/114 R
See application file for complete search history.

(56) References Cited

U.S. PATENT DOCUMENTS

| 1,746,860 A | 2/1930 | Lloyd |
| 2,237,032 A | 4/1941 | Haux |
(Continued)

FOREIGN PATENT DOCUMENTS

| CN | 1285335 | 8/2006 |
| JP | 09110549 | 4/1997 |
(Continued)

OTHER PUBLICATIONS

"Production of Lightweight Aggregates and its Properties", William Andrew Publishing, 2002, pp. 21-22.

*Primary Examiner* — Gary S Hartmann
(74) *Attorney, Agent, or Firm* — C. John Brannon; Brannon Sowers & Cracraft PC

(57) ABSTRACT

A method of making a roadbed, including paving an area with foamed glass bodies to define a bed and covering the bed with a layer of cementitious material to define a composite bed. The composite bed is at least 85 percent foamed glass bodies. The composite bed has a cementitious surface.

13 Claims, 2 Drawing Sheets

Related U.S. Application Data continuation-in-part of application No. 11/966,487, filed on Dec. 28, 2007, now abandoned, and a continuation-in-part of application No. 14/301,988, filed on Jun. 11, 2014, now Pat. No. 9,382,671, and a continuation-in-part of application No. 11/276,193, filed on Feb. 17, 2006, now Pat. No. 9,376,344.

(51) Int. Cl.
  *C04B 28/04* (2006.01)
  *C04B 111/00* (2006.01)

(56) References Cited

U.S. PATENT DOCUMENTS

| | | |
|---|---|---|
| 2,484,911 A | 10/1949 | Merritt |
| 2,514,324 A | 7/1950 | Ford |
| 2,620,597 A | 12/1952 | Ford |
| 2,955,049 A | 10/1960 | Booth |
| 2,977,721 A | 4/1961 | Gronow et al. |
| 3,054,139 A | 9/1962 | Bartholomew et al. |
| 3,056,184 A | 10/1962 | Blaha |
| 3,066,896 A | 12/1962 | Schirtzinger |
| 3,109,727 A | 11/1963 | Young et al. |
| 3,174,870 A | 3/1965 | Connelly et al. |
| 3,321,414 A | 5/1967 | Otto |
| 3,325,341 A | 6/1967 | Shannon |
| 3,348,933 A | 10/1967 | Schulz |
| 3,432,580 A | 3/1969 | Heidrich et al. |
| 3,443,920 A | 5/1969 | Overcashier |
| 3,459,565 A | 8/1969 | Jones et al. |
| 3,505,089 A | 4/1970 | Rostoker |
| 3,527,587 A | 9/1970 | Velev et al. |
| 3,532,480 A | 10/1970 | D'Eustachio |
| 3,574,583 A | 4/1971 | Goldsmith |
| 3,607,170 A | 9/1971 | Malesak |
| 3,855,014 A | 12/1974 | De Vries et al. |
| 3,870,496 A | 3/1975 | Cutler |
| 3,874,861 A | 4/1975 | Kurz |
| 3,945,816 A | 3/1976 | Johnson |
| 3,963,503 A | 6/1976 | Mackenzie |
| 3,967,704 A * | 7/1976 | Ogden ............ B64F 1/025 521/107 |
| 3,972,667 A | 8/1976 | Han |
| 3,981,602 A | 9/1976 | Ogden |
| 4,038,063 A | 7/1977 | Williams et al. |
| 4,043,719 A | 8/1977 | Jones |
| 4,049,439 A | 9/1977 | Nakamura et al. |
| 4,050,873 A | 9/1977 | Brunlik et al. |
| 4,059,423 A | 11/1977 | De Vos et al. |
| 4,081,259 A | 3/1978 | Bassin et al. |
| 4,086,015 A | 4/1978 | Eliasson |
| 4,086,098 A | 4/1978 | Le Ruyet et al. |
| 4,110,098 A | 8/1978 | Mattmuller |
| 4,124,365 A | 11/1978 | Williams et al. |
| 4,143,202 A | 3/1979 | Tseng et al. |
| 4,190,416 A | 2/1980 | North |
| 4,198,224 A | 4/1980 | Kirkpatrick |
| 4,212,635 A | 7/1980 | North |
| 4,274,825 A | 6/1981 | North |
| 4,289,521 A | 9/1981 | Scymura |
| 4,430,108 A | 2/1984 | Hojaji et al. |
| 4,441,905 A | 4/1984 | Malmendier et al. |
| 4,797,319 A | 1/1989 | Yoshida et al. |
| 4,826,788 A | 5/1989 | Dennerl et al. |
| 4,871,395 A | 10/1989 | Sugama |
| 4,933,306 A | 6/1990 | Pietsch |
| 4,981,820 A | 1/1991 | Redlund et al. |
| 4,992,321 A | 2/1991 | Kandachi et al. |
| 5,193,764 A | 3/1993 | Larratt |
| 5,326,382 A | 7/1994 | Oat |
| 5,393,342 A | 2/1995 | Hooykaas |
| 5,516,351 A | 5/1996 | Solomon et al. |
| 5,605,570 A | 2/1997 | Bean et al. |
| 5,711,801 A | 1/1998 | Chatterji et al. |
| 5,716,910 A | 2/1998 | Totten et al. |
| 5,821,184 A | 10/1998 | Haines et al. |
| 5,885,025 A | 3/1999 | Angley |
| 5,902,068 A | 5/1999 | Angley |
| 5,928,773 A | 7/1999 | Andersen |
| 5,972,817 A | 10/1999 | Haines et al. |
| 5,983,671 A | 11/1999 | Haines et al. |
| 6,616,752 B1 | 9/2003 | Basura et al. |
| 6,616,866 B1 | 9/2003 | Crompton |
| 6,616,873 B1 | 9/2003 | Duraiswami et al. |
| 6,685,387 B2 | 2/2004 | Allen |
| 6,726,400 B1 | 4/2004 | Angley |
| 6,776,237 B2 | 8/2004 | Dao et al. |
| 6,971,817 B2 | 12/2005 | Allen |
| 7,261,490 B2 | 8/2007 | Allen |
| 7,597,502 B2 | 10/2009 | Allen |
| 7,744,303 B2 | 6/2010 | Rastegar |
| 7,837,409 B2 | 11/2010 | Mahal et al. |
| 7,901,154 B2 | 3/2011 | Carr |
| 7,905,678 B2 | 3/2011 | Rastegar |
| 8,002,495 B2 | 8/2011 | Rastegar |
| 8,021,074 B2 | 9/2011 | Valentini |
| 8,021,075 B2 | 9/2011 | Valentini |
| 8,171,751 B1 | 5/2012 | Ungerleider |
| 8,579,542 B2 | 11/2013 | Narmo |
| 8,740,141 B2 | 6/2014 | Prevost |
| 9,376,344 B2 | 6/2016 | Ramsey |
| 9,382,671 B2 | 7/2016 | Ungerleider |
| 9,573,700 B2 | 2/2017 | Galbus |
| 9,637,246 B2 | 5/2017 | Ungerleider |
| 9,725,350 B2 | 8/2017 | Lehman |
| 9,802,717 B2 | 10/2017 | Valentini |
| 9,963,373 B2 | 5/2018 | Lehman |
| 10,160,554 B2 | 12/2018 | Barsotti |
| 10,196,156 B2 | 2/2019 | Valentini |
| 10,364,045 B2 | 7/2019 | Barsotti |
| 10,427,802 B2 | 10/2019 | Valentini |
| 10,435,177 B2 * | 10/2019 | Ungerleider ............ E01C 9/007 |
| 10,458,073 B2 | 10/2019 | Doherty |
| 10,557,236 B1 | 2/2020 | Barsotti |
| 10,647,447 B2 * | 5/2020 | Ungerleider .......... C03C 11/007 |
| 10,711,407 B2 | 7/2020 | Webber |
| 10,906,666 B2 * | 2/2021 | Valentini ................ E01C 9/007 |
| 2003/0097857 A1 | 5/2003 | Oei |
| 2007/0194476 A1 | 8/2007 | Ramsey |
| 2009/0166469 A1 | 7/2009 | Prevost et al. |
| 2010/0028078 A1 | 2/2010 | Carr et al. |
| 2012/0057931 A1 | 3/2012 | Narmo |
| 2012/0177871 A1* | 7/2012 | Ramsey ................ B32B 5/245 428/113 |
| 2013/0020437 A1 | 1/2013 | Valentini et al. |
| 2013/0344337 A1 | 12/2013 | Qi et al. |
| 2014/0294501 A1 | 10/2014 | Ungerleider |
| 2015/0247298 A1 | 9/2015 | Li |
| 2015/0251773 A1 | 9/2015 | Doherty |
| 2016/0176544 A1 | 6/2016 | Valentini |
| 2016/0340838 A1 | 11/2016 | Doherty |
| 2016/0355277 A1 | 12/2016 | Ungerleider |
| 2017/0121035 A1 | 5/2017 | Ungerleider |
| 2017/0297739 A1 | 10/2017 | Valentini |
| 2017/0356137 A1 | 12/2017 | Webber |
| 2020/0385144 A1* | 12/2020 | Ungerleider ............ E01C 3/003 |
| 2021/0171215 A1* | 6/2021 | Ungerleider ............ C03C 1/002 |
| 2021/0188459 A1* | 6/2021 | Ungerleider ............ E01C 9/007 |
| 2022/0315244 A1* | 10/2022 | Ungerleider ............ E01C 19/00 |

FOREIGN PATENT DOCUMENTS

| | | |
|---|---|---|
| JP | 09124378 | 5/1997 |
| JP | 2004238214 | 8/2004 |
| RU | 2145315 | 2/2000 |
| RU | 2149853 | 5/2000 |
| RU | 2203252 | 4/2003 |
| WO | 9009355 | 8/1990 |
| WO | 2006068490 | 6/2006 |

* cited by examiner

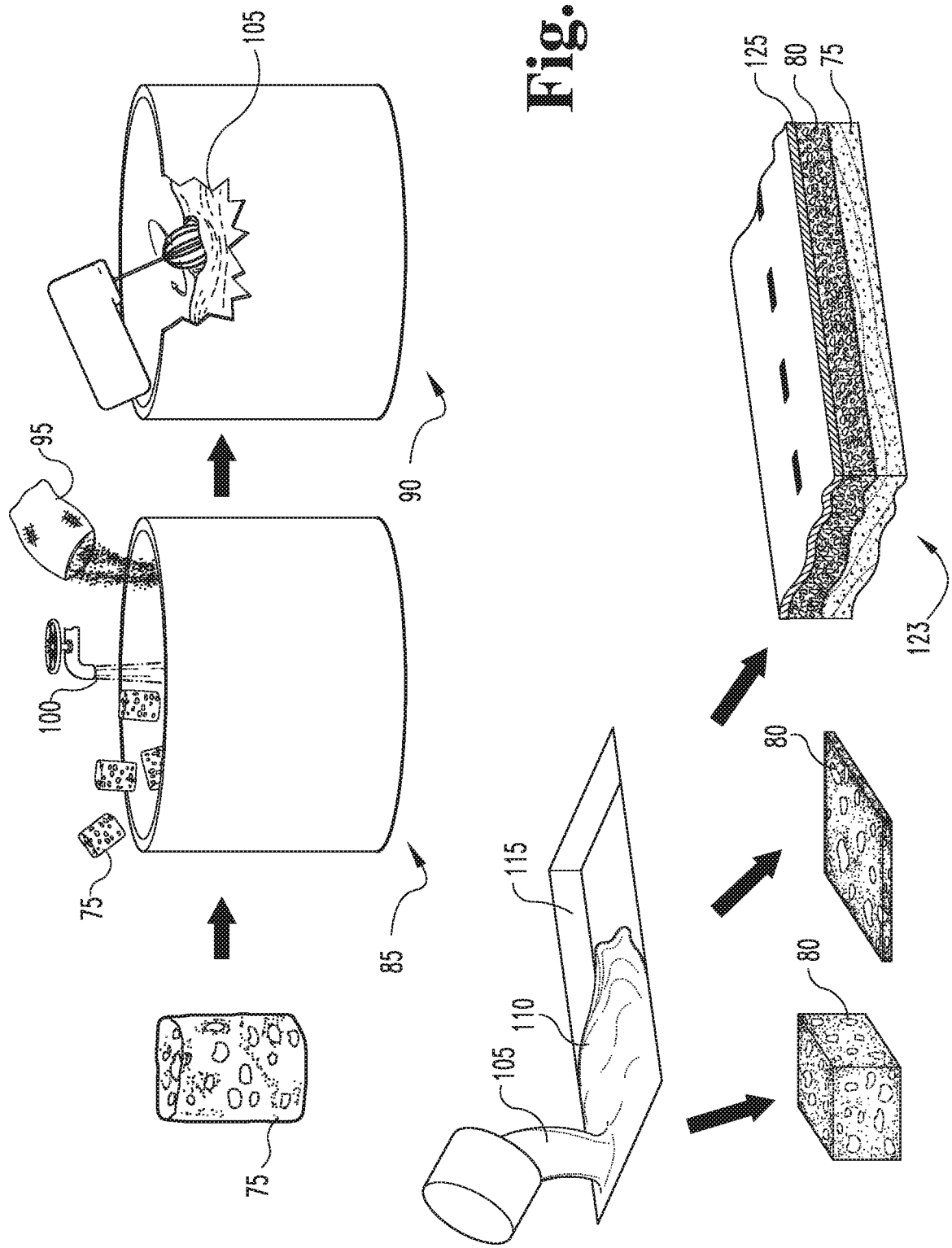

FOAMED GLASS COMPOSITE MATERIAL AND A METHOD FOR PRODUCING THE SAME

CROSS-REFERENCE TO RELATED APPLICATIONS

This patent application claims priority to co-pending U.S. patent application Ser. No. 11/276,193 filed on Feb. 17, 2006.

TECHNICAL FIELD

The invention relates generally to the field of ceramic materials and specifically, to a composite ceramic material including a foamed glass or foamed silaceous slag portion and a cemetitious, concrete, gypsum or other ceramic portion, and method of making the same.

BACKGROUND

Foamed glass is an established lightweight ceramic material. Typically, foamed glass is made in one of two ways. The first way involves preparing a stable foam from water and foaming agent, preparing a wet mixture or slurry of solid components (where cement is the main substance), quick mixing the foam and the slurry, filling molds with prepared the mixed foam/slurry, and firing the same. The second way to make foamed glass involves making use of the property of some materials to evolve a gas when heated. A foamed glass material may be prepared by mixing crushed vitreous particles and a foaming agent (such as $CaCO_3$ or $CaSO_4$), placing the mixture in a mold, heating the mold (such as by passing the mold through a furnace) to a foaming temperature, and cooling the mold to produce foamed glass bodies.

Slag is a nonmetallic byproduct of metallurgical operations. Slags typically consist of calcium, magnesium, and aluminum silicates in various combinations. Iron and steel slags are byproducts of iron and steel production. For example, an iron blast furnace is typically charged with iron ore, fluxing agents (such as limestone or dolomite) and coke (as fuel and reducing agent). Iron ore is typically a mixture of iron oxides, silica, and alumina. When sufficiently heated, molten slag and iron are produced. Upon separation of the iron, the slag is left over. The slag occurs as a molten liquid melt and is a complex solution of silicates and oxides that solidifies upon cooling.

The physical properties of the slag, such as its density, porosity, mean particle size, particle size distribution, and the like are affected by both its chemical composition and the rate at which it was cooled. The types of slag produced may thus conveniently be classified according to the cooling method used to produce them—air cooled, expanded, and granulated. Each type of slag has different properties and, thus, different applications.

While useful as insulation, roadway fill and abrasive materials, foamed glass bodies (with or without foamed slag), are typically unsuitable for use as lightweight filler due to cost and their propensity to hydrate and expand. Thus, there remains a need for an easily produced foamed glass material that is more resistant to expansion from hydration and/or more easily aged. The present invention addresses this need.

SUMMARY

The technology discussed below relates to manufactured composite materials, such as acoustic tile and manufactured stone, from foamed glass and (typically gypsum based) cementitious or other ceramic materials, and the method for making the same. One object of the present invention is to provide an improved foamed glass-containing material. Related objects and advantages of the present invention will be apparent from the following description.

BRIEF DESCRIPTION OF THE DRAWINGS

FIG. 2 is a schematic view of a roadbed and its method of manufacture from the foamed glass composite material of FIG. 1.

DETAILED DESCRIPTION OF THE PREFERRED EMBODIMENTS

Figure 1:
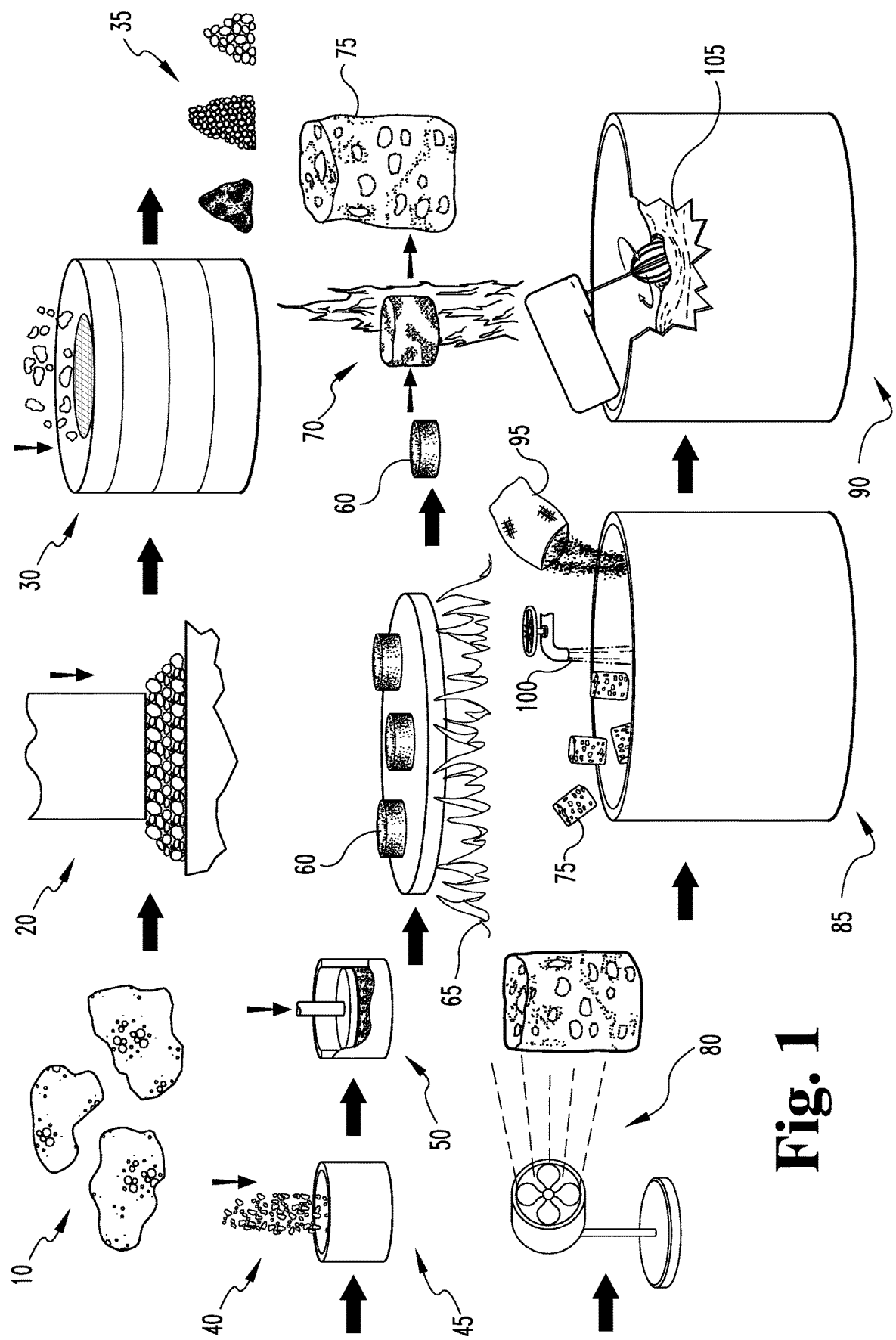
FIG. 1 is a schematic view of a first embodiment of a process for making foamed glass composites.

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the claimed technology as illustrated therein being contemplated as would normally occur to one skilled in the art to which the claimed technology relates.

Vitreous materials, such as soda-lime-silica glasses and metallurgical byproduct slags, are typically foamed through a gasification processes to yield a typically predominately vitreous, typically silaceous resultant cellular product. Typically, a foaming precursor is predominately vitreous or non-crystalline prior to the foaming process, since a glassy precursor slag material typically has a viscosity at temperature that is convenient to the foaming process. More typically, the vitreous starting material will have a traditional soda-lime-silica glass composition, but other compositions, such as aluminosilicate glasses, borosilicate glasses, vitreous peralkaline slag or other vitreous slag compositions may be foamed as well. For example, a peraluminous slag with significant alkali and alkaline earth oxides may also be utilized. After the vitreous precursor is foamed, the foamed glass is physically combined with cement to form a composite material suitable for building or structural applications or the like.

In the case of slagaceous precursor materials 10, the slag is typically predominately vitreous in character, and more typically has a maximum 40% by volume crystalline material. The slag 10 is typically initially crushed 20 and sized 30 to approximately 10 microns median particle size, more typically at least 90 percent of all particles are less than 75 microns.

If the crushed and/or powdered slag 35 is dry, water is added to the powdered slag to about 0.1 to about 0.5% (by mass). Alternately, if no water is added, limestone or other solid foaming agent may be added (typically about 4 percent or less by mass, more typically about 2 percent or less by mass). The mixture 40 is then formed 45, 50 into pellets 60 (between 0.05 and 1 cubic centimeter), preheated 65 (to no more than within 25° C. of the dilatometric softening point) and then passed through a high temperature zone 70, such as one generated by a rotary kiln or a flame (contained in a ceramic or refractory metal tube). The residence time in the zone is short, typically about 0.5 to about 10 seconds, and the temperature is high (adiabatic flame temperature in excess of 1300° C.). In the case of a flame, the thermal energy provided to the material by the direct flame enables a change of state reaction in the foaming agent and the resulting gas will force the now viscous matter to foam. The foamed pellets 75 or foamed media are air quenched below the dilatometric softening point of the material, and then allowed to dry by slow cooling.

The foamed media 75 typically have a relative volume expansion in excess of three fold, and more typically the volume expansion is as high as 10 fold or greater. This process results in individual, low-density (specific gravity less than 0.3) foamed media 75 with a median pore size in the range of 0.1 to 2 mm.

Composite materials 80 may be prepared by mixing the foamed slag 75 with Portland cement 95; at least two types of composite materials may be made according to this technique. A first composite material 80 may be prepared by mixing 85, 90 a thin mixture of cement 95 with foamed media 75, wherein the foamed media 75 comprises at least 85 volume percent of the total cement/other aggregate. The foamed media 75 are typically incorporated into the cement 95 (and aggregates, if needed) after the water 100 has been added. The resulting mixture 105 acts as a very viscous material and is pressure or gravity formed into a slab (or other coherent shape) or direct cast into a prefabricated form 115. The shape or form is then allowed to set. The resulting composite material sets up to be a rigid, relatively light-weight (specific gravity <0.75) material with surface properties typical of Portland cements. Chemicals and finishing systems 125 compatible with Portland cement can be used in conjunction with this material.

A second composite material 80 is formed as a mixture 105 of cement 95 with typically less than 50 volume percent foamed slag media 75. The media is typically dry mixed with cement prior to water additions 100. The mixture 105 is then prepared as common cement. Additional aggregates may be incorporated as per common practice. This second composite material has a very high strength; the composite compressive strength is typically at least 25% higher per unit mass than is that of the identical cement prepared without the foamed slag addition. It can be used in any application compatible with Portland cement.

A third composite material 80 is formed as aqueous slurry mixture 105 comprised of gypsum with typically less than 50 percent by volume foamed glass or slag. The media 75 are typically added to the gypsum after the material is slurried 90. Additional binders, fillers and setting agents may be added per common practice. The resulting material has a very low density and high acoustic absorption. There are no chemical compatibility limitations on the extent of foamed glass additions. Any limitations typically arise from strength considerations and other physical properties.

In one embodiment, the composite 80 is formed as a roadbed 123, typically by pouring the mixture 105 into a roadbed cutout or preform 115 and allowed to cure into a composite roadbed 80. The composite 80 may be formed over a layer of foamed glass bodies 75, or directly onto the ground below the roadbed 123. The roadbed is typically finished 125 to have a smooth cement top layer or finishing layer 125. Alternately, a sufficiently thin mixture of cement 95 may be poured over a layer of foamed glass bodies 75 so as to infiltrate the bodies 75 to yield a layer of composite material 80.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A method of making a roadbed, comprising: a) paving an area with foamed glass bodies to define a bed; and b) covering the bed with a layer of cementitious material to define a composite bed; wherein the foamed glass bodies have interconnected open cell porosity; wherein the composite bed is at least 85 percent foamed glass bodies in a cementitious matrix; and wherein the composite bed has a cementitious surface.

2. The method of claim 1 wherein the foamed glass bodies have traditional soda-lime-silica compositions.

3. The method of claim 2 wherein the glass bodies have compositions in the range around 70 weight percent silica, around 13 weight percent soda and around 10 weight percent lime with the remainder being other metal oxides.

4. The method of claim 1 and further comprising d) before step a), mixing the foamed glass bodies with a cementitious material to define a paving mixture; wherein a) and b) occur simultaneously.

5. The method of claim 1 wherein after b), an underbed comprised entirely of foamed glass bodies underlies the composite bed.

6. The method of claim 1 wherein the composite bed includes a cementitious matrix material in which the foamed glass bodies are distributed.

7. The method of claim 1 wherein the foamed glass is foamed slag.

8. The method of claim 7 wherein the foamed glass has a specific gravity of less than 0.3 and a median pore size between 0.1 mm and 2 mm.

9. The method of claim 1 wherein steps a) and b) are conducted simultaneously and wherein the foamed glass aggregate and cementitious matrix material are provided as a viscous mixture.

10. A composite roadbed, comprising: a foamed glass aggregate portion filling a roadbed; a cementitious matrix portion infiltrating the foamed glass aggregate portion to define a composite bed; wherein the composite bed is at least 85 percent foamed glass bodies; wherein the foamed glass aggregate portion has an open cell structure; wherein the composite material has a specific gravity of less than 0.75; and wherein the composite bed has a cementitious surface.

11. The composite roadbed of claim 10 wherein the cementitious matrix portion and the cementitious surface are Portland cement.

12. The method of claim 10 wherein the foamed glass is foamed slag having a specific gravity of less than 0.3 and a median pore size between 0.1 mm and 2 mm.

13. A composite roadbed, comprising in combination: a plurality of foamed glass aggregate bodies filling a roadbed; a cement matrix infiltrating at least a portion of the foamed glass aggregate bodies and defining a composite bed; wherein the composite bed is at least 85 percent foamed glass aggregate bodies; wherein respective foamed glass aggregate bodies have an interconnected open cell microstructure; wherein the composite bed has a specific gravity of less than 0.75; and wherein the respective aggregate bodies remain within the composite bed such that the composite bed has a cementitious surface.

* * * * *